UNITED STATES PATENT OFFICE.

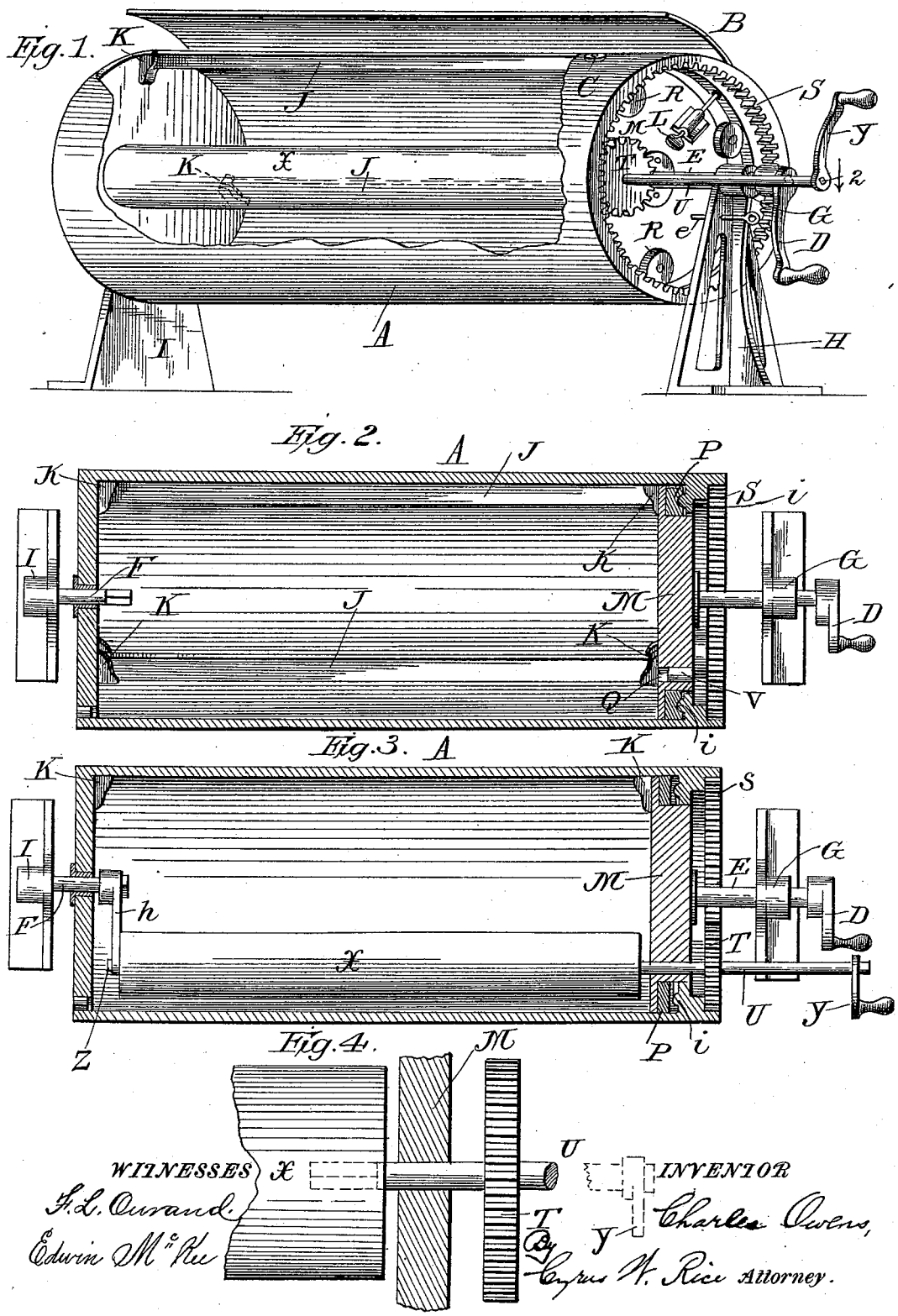

CHARLES OWENS, OF GERLAW, ILLINOIS.

CHURN.

SPECIFICATION forming part of Letters Patent No. 511,275, dated December 19, 1893.

Application filed May 1, 1893. Serial No. 472,640. (No model.)

*To all whom it may concern:*

Be it known that I, CHARLES OWENS, a citizen of the United States, residing at Gerlaw, in the county of Warren and State of Illinois, have invented an Improved Combination Churn and Butter-Worker, of which the following is a specification.

This invention relates generally to combined churn and butter workers, and particularly to one which is adapted to be transformed into a butter worker substantially like that claimed in my application for Letters Patent filed June 9, 1891, Serial No. 395,733, consisting of the same cylindrical vessel used in the process of churning, together with the roller inside the vessel and near the side of it, the vessel and roller rotating in the same direction on their respective axes, whereby the butter is compressed again and again between the roller and the side of the vessel nearest thereto.

The nature of my invention and its principle consist in the construction of a churn comprising a cylindrical vessel, having as dashers, longitudinal slats, on the inside of the vessel, said vessel revoluble about its axis, by which motion the cream therein contained is churned into butter by the slats (carried by the vessel) striking it; the end of the vessel being formed of a separate piece from the rest of the vessel, and capable of being fastened tightly to the rest of the vessel so as to revolve with it in churning; and also capable of being fixed stationary so that the rest of the vessel may revolve around it, thus adapting the vessel to be used as a butter worker of the sort referred to above.

This, my invention, I embody in the novel features of construction and arrangement shown in the following described mechanism, and the object of the invention is attained thereby.

In the annexed drawings, Figure 1 represents a general view in perspective of my improved churn together with the attachments required to transform it into a butter worker. A part of the side of this vessel is removed in this figure, to show the interior. Fig. 2, represents a sectional view of my churn on the line of the axis of the cylindrical vessel. Fig. 3 represents a sectional view of the cylindrical vessel on the line of its axis as transformed into a butter worker. Fig. 4 represents shaft, crank, and cog wheel and part of roller by which the butter worker is operated, shown here for the purpose of illustrating how such mechanism is attached to the churn when the same is transformed into a butter worker.

The cylindrical vessel A has a suitable opening for putting in cream, taking out butter, &c., which is closed by a tight cover B. This cover may, of course, be fastened in any suitable manner, as by means of the buttons C. In churning, this vessel is rotated on the shaft E at one end and the spindle F at the other end. The shaft E revolves with the vessel in churning and turns in the journal G supported by the standard H, to which shaft E the motive power for churning is applied in a suitable manner, as by the crank D.

The spindle F at the other end of the vessel A is supported by the standard I, and the vessel A revolves around it, it remaining stationary. The slats or dashers J, preferably three or four in number in a machine of ordinary size, may be held in position on the inside of the vessel by the parallel pairs of small cleats K, the recess or groove between each pair of which being adapted to receive the end of the slat J and hold it tightly in position, but so that the slat J may be withdrawn from the grooves when desired. In practice, however, it will be found that the small cleats K are usually unnecessary, as the slats J, if made long enough to fit tightly between the ends of the vessel A, will be held in position by that means merely. The central portion M of that end of the vessel which has the shaft E is a circular disk of separate piece from the rest of the vessel, and around which disk M, the rest of the vessel (when transformed into a butter worker) may revolve, while the disk M remains stationary. The shaft E is attached to the center of the disk M. The circular rib $i$ presses tightly against the packing P (which is preferably of cork), when the machine is used in churning; or the rib $i$ may, of course, be on the disk M instead of where it is shown on the drawings. When transformed into the butter worker, the main part of the vessel turns on the friction wheels R which revolve on spindles attached to the disk M. Also, the same end of the vessel A is furnished with the ring S attached to the main part of the vessel, concentric with the disk M and the shaft E; the inside of which ring S has teeth into which (when the machine is used as a butter worker) mesh the teeth of the cog wheel T. The disk M has the circular perforation Q in which turns the shaft U as in a journal box when the machine is used as a butter worker.

When the machine is used as a churn, the shaft U is removed, and the opening Q is closed by a suitable stopper V. The shaft U (which carries the roller X) inside the vessel A is squared to fit a square aperture in the center of the end of the roller. The other end of the roller has in its center the shaft or pivot Z which revolves in a journal box on a support $h$. The disk M is held rigidly stationary when the machine is used as a butter worker by any suitable means, as by the sliding bolt $e$ in the standard H, being slid into a suitable pit in the disk M.

When the machine is used as a butter worker, the disk M is fastened in such a position that the shaft E and the shaft U at one end of the vessel correspond in position with the spindle F and shaft Z on the roller, respectively, at the other end of the vessel.

In the operation of churning, it will be found that the slats J, being of sufficient length, will, when put in place press the disk M so tightly against the main part of the vessel, the washer P between being compressed, that when the shaft E and the disk M are revolved, the rest of the vessel A will be carried with them; but in order to surely prevent the disk M from turning without the rest of the vessel, the bolt L on the disk M may be slid into a pit in the main body of the vessel.

This machine is used as a churn in the following manner: The shaft U with the crank and cog wheel are removed; then the roller X is taken out of the vessel; the orifice Q in which turns the shaft U is closed with its stopper; the bolt $e$ is drawn back, so that the disk M may revolve; the slats J are placed in position and the cream being placed in the vessel, the vessel is rotated by the shaft E, the axis being horizontal or nearly so.

The machine is transformed into a butter worker in the following manner: The slats J are taken out; the roller X is placed into position inside the churn, and the shaft U with its cog wheel and crank are all placed in position; the disk M is secured in position by the bolt $e$; the bolt L is drawn back, and the crank Y is turned in the direction indicated by the arrows on the drawings; this rotates the roller X and the vessel A in the same direction, the disk M remaining stationary. It is evident that this churn may be adapted to be transformed into a butter worker having more than one roller, and that the roller may be of various shapes and forms.

Of course I do not confine myself to the exact mechanism above described as the only embodiment of my invention.

What I do claim as new, and desire to secure by Letters Patent, is—

1. In a combination churn and butter worker, the rotatable vessel A, the head M rotatably secured to said vessel, and means for immovably securing the head M and vessel together, substantially as described.

2. In a combination churn and butter worker, the vessel A provided with the inwardly projecting flange or rib $i$, the head M rotatably fitting the vessel, a packing between the head and flange, cleats K on the inner side of the head and constructed to be engaged by dasher slats so as to hold said head immovably against the flange, substantially as shown and described.

CHARLES OWENS.

Witnesses:
ALEXANDER E. MONTGOMERY,
EMILY ANDERSON.